United States Patent
Rao et al.

(10) Patent No.: US 6,265,110 B1
(45) Date of Patent: Jul. 24, 2001

(54) LITHIUM SECONDARY BATTERY WITH FLAKE GRAPHITE NEGATIVE ELECTRODE

(75) Inventors: Ningling Rao, Arslev; Steen Yde-Andersen, Odense S, both of (DK)

(73) Assignee: Danionics A/S, Odense S. (DK)

(*) Notice: Subject to any disclaimer, the term of this patent is extended or adjusted under 35 U.S.C. 154(b) by 0 days.

(21) Appl. No.: 09/331,559
(22) PCT Filed: Dec. 19, 1997
(86) PCT No.: PCT/EP97/07277
§ 371 Date: Sep. 23, 1999
§ 102(e) Date: Sep. 23, 1999
(87) PCT Pub. No.: WO98/28806
PCT Pub. Date: Jul. 2, 1998

(30) Foreign Application Priority Data

Dec. 20, 1996 (DK) .................................... 1458/96

(51) Int. Cl.⁷ ...................................... H01M 4/58
(52) U.S. Cl. ...................... 429/231.8; 429/330; 429/338; 429/332; 429/217; 429/231.1
(58) Field of Search ............................ 429/231.8, 218.1, 429/223, 224, 330, 213, 338, 332, 217, 231.1

(56) References Cited

U.S. PATENT DOCUMENTS

| | | | |
|---|---|---|---|
| 5,348,818 | * 9/1994 | Asami et al. | 429/213 |
| 5,437,943 | 8/1995 | Fujii et al. | 429/192 |
| 5,643,695 | 7/1997 | Barker et al. | 429/197 |
| 5,721,071 | * 2/1998 | Sonobe et al. | 429/218.1 |
| 5,759,715 | * 6/1998 | Barker et al. | 429/218.1 |

FOREIGN PATENT DOCUMENTS

| | | |
|---|---|---|
| 0 541 889 A1 | 5/1993 | (EP) . |
| 0 627 776 A2 | 12/1994 | (EP) . |
| WO 96/18215 | 6/1996 | (WO) . |

OTHER PUBLICATIONS

Patent Abstract of Japan, Publication No. 08298117A, 1996.
Derwent Abstract, JP8064244, 1996.
Ebner, W., et al., Solid State Ionics, 69, pp. 238–256, 1994.
Jiang, Z., et al., J. Electrochem. Soc., vol. 142, No. 2, pp. 333–340, 1995.

* cited by examiner

Primary Examiner—Laura Weiner
(74) Attorney, Agent, or Firm—Darb & Darby

(57) ABSTRACT

A lithium secondary battery has a negative electrode structure, an electrolyte and a positive cathode structure, the negative electrode structure being of at least 40% by weight of natural flake graphite, having an $L_a$-value of at least 300 nm and/or an $L_c$-value in the range 50–150 nm and an $L_a$–$L_c$-ratio of at least 2, and the electrolyte having at least 10% by weight of propylene carbonate based on the weight of the solvent and salts of the electrolyte system. Natural flake graphite is compatible with propylene carbonate containing electrolytes, thereby forming stable battery configurations.

12 Claims, No Drawings

LITHIUM SECONDARY BATTERY WITH FLAKE GRAPHITE NEGATIVE ELECTRODE

The present invention relates to a lithium secondary battery, in particular a lithium secondary battery having a graphite negative electrode structure and comprising a non-aqueous electrolyte, and to a method for the production thereof.

The use of lithium intercalation electrode structures and non-aqueous electrolytes has allowed the development of electrochemical systems based on carbon for the negative electrode and transition metal oxides for the positive electrode. Such batteries, which are referred to as "rocking chair batteries" since the lithium ions are "rocked back and forth" between the electrodes, or as "lithium-ion batteries" since the active lithium is always in its ionic form, display high energy density and high cyclability, i.e. the system can be discharged and recharged a large number of times.

For the negative electrode structure of such electrochemical systems, the electrode capacity, rate capability and cyclability are related to the physico-chemical characteristics of the constituent carbons (cf. Ebner, W. et al.: Solid State Ionics, Vol. 69 (1994) pp. 238–56). Ordered carbon structures like graphite are usually referred to as offering a higher reversible intercalation capacity, compared to the more disordered structures like coke. Graphite-based lithium-ion batteries also have a higher operational voltage and they display a flat discharge profile highly adapted for a large number of electronic applications.

Graphite is a highly ordered carbon with a well defined structure. The carbon atoms are arranged in hexagonal rings in a two-dimensional array. The length of this array is defined as $L_a$. The hexagonal ring-layers are stacked on top of each other, either in an ABAB-sequence, or, less usually, in an ABCABC-sequence. The distance between two adjacent layers, defined at $d_{002}$, is 3.354 Å, and the length of the stacked layers along the stacking direction is defined as $L_c$. Graphite has a density of 2.26 g/cm$^3$.

There are two types of graphite; natural graphite and artificial graphite. Natural graphite is found in the earth's crust whereas artificial graphite is produced through heating of e.g. cokes or carbonaceous gases up to 2500–3400° C.

Most commonly, the graphite used for negative electrodes in lithium ion batteries is an artificial graphite. The $L_a$ and $L_c$ values thereof are usually larger than 100 nm and $L_a/L_c$ ratio less than 2. Compared to artificial graphite, natural graphites, and in particular natural flake graphites, display crystallites, which are longer and thinner. For the natural flake graphites, the $L_a$-value is typically 2 to 10 times higher than the $L_c$-value. A typical natural flake graphite has an $L_a$-value of 300 nm and an $L_c$-value of 50–100 nm.

A key feature for a negative electrode based on carbon is the initial irreversible loss which occurs during the first charge of the battery. This is due to an electrochemical reaction between the carbon negative electrode—or merely the lithium content thereof—and the lithium salt-containing organic electrolyte. During the reaction a passivating film is formed on the anode, preventing it from further reacting with the electrolyte.

Negative electrodes based on coke structures can function perfectly with most non-aqueous solvents, e.g. a propylene carbonate (PC)-based electrolyte. In contrast, this solvent decomposes on the surface of a graphite-based negative electrode. This reaction, due to the instability between PC and graphite, causes an exfoliation of the graphite-layered structure, which may destroy the electrode structure before any lithium intercalation can take place. Further, the reaction products ("reduced PC") may react with the lithium salt of the electrolyte, causing further loss of active material. These phenomena have been described by many scientists, see e.g. Z. Jiang, M. Almagir and K. M. Abraham, J. Electrochem. Soc., Vol. 142, No.2, 333–340 (1995).

Therefore, the unfortunate drawback of most known lithium-ion batteries with graphite-based negative electrode structures is their poor compatibility with many electrolyte solvents.

A few organic solvent are stable with respect to graphite, including ethylene carbonate (EC) and dimethyl carbonate (DMC). These solvents, however, suffer from handling difficulties. Since DMC is a volatile solvent with a low boiling point of 90° C., and since EC has a melting point of 38° C. and therefore is solid at room temperature, their handling is difficult. During the addition of the electrolyte to the battery a large amount of DMC may evaporate, whereas EC may solidify. In terms of handling, solvents with high boiling points, which also have low melting points, are preferred in these batteries which operate between −20° C. and 60° C. Such solvents, including the abovementioned propylene carbonate, have traditionally been unstable with respect to graphite.

In the literature, few examples are given on graphite materials which can work with a PC-containing electrolyte.

U.S. Pat. No. 5,643,695 to Valence describes a battery, the first electrode of which is a graphite based electrode, characterised in that the interlayer spacing of the graphite ($d_{002}$) is in the range 3.35–3.36 Å, the crystallite size in the direction of the c-axis ($L_c$) is in the range 100–200 nm, the BET surface area is in the range 6–16 m$^2$/g and at least 90% of the graphite particles have a size less than 16 μm. The electrolyte of the battery configuration is a mixture of EC, PC and optionally one other solvent, the EC being present in an amount not less than the amount of PC. The preferred graphite of this invention is SFG-15 from Lonza, which is an artificial graphite.

In most cases, however, PC-graphite combinations suffer from high losses of active material due to solvent decomposition and passivating film formation. In addition, for the above technology based on artificial graphite, only a rather poor density of the negative electrode structure can be obtained. The stacking of the "cubic" crystallites of the artificial graphites does not allow densities greater than 0.6 g/cm$^3$. Such low gravimetric density of the negative electrode leads to a rather low energy density of the complete battery.

Therefore, there is a need for new lithium secondary battery configurations of applicable solvents and graphite electrodes in order to facilitate handling, achieve a broad working temperature range, and provide good chemical and electrochemical stabilities. Such configurations should have high capacity, high energy density, low initial loss and flat discharge voltage profile.

It is thus an object of the invention to provide a new type of lithium secondary battery of high capacity, energy density and flat discharge profile, based on a graphite negative electrode structures, which can work with a broader selection of PC-containing electrolytes.

Surprisingly it has been found, that a group of electrodes based on natural flake graphite is compatible with PC-containing electrolytes, thereby forming stable battery configurations. This new type of electrode material shows a low initial capacity loss of less than 100 mAh/g, i.e. 22% of the initial capacity, a high reversible capacity of more than 340 mAh/g, good cyciability and flat discharge voltage profile. The natural flake graphites allow construction of electrode structures of densities higher than 0.8 g/cm$^3$, compared to the artificial graphites of an electrode density lower than 0.7 g/cm$^3$ with the same configuration. The higher gravimetric density of the negative electrode allows a higher energy density of the complete battery.

The use of natural graphite is described in the Japanese patent application JP 08,298,117 A to Kansai Coke & Chem. Co. Ltd. This patent application describes obtaining improved charge/discharge capacity and efficiency by using scalelike natural graphite pulverised by a jet mill. The application, however, does not describe the advantageous combination of natural graphite and propylene carbonate.

The present invention provides a lithium secondary battery comprising a negative electrode structure, an electrolyte and a positive cathode structure, said negative electrode structure comprising at least 40% by weight of natural flake graphite having an $L_a/L_c$-ratio of at least 2, and said electrolyte comprising at least 10% by weight of propylene carbonate based on the weight of the solvent and salts of the electrolyte system. Such compositions are compatible with PC-containing electrolytes, thereby forming stable battery configurations.

It is preferred that the natural flake graphite has $L_a$-values above 300 nm and $L_c$ values in the range 50–150 nm.

In a preferred embodiment of the invention, the natural flake graphite has a particle size of less than 10 μm, preferably less than 5 μm.

The positive electrode structure may be a Li-intercalation material, preferably a lithium transition metal oxide, such as LiCoO$_2$, LiNiO$_2$, LiMn$_2$O$_4$, LiMnO$_2$, or a mixture thereof, or any other material capable of donating Li$^+$-ions.

In another preferred embodiment, a carbon black is added to the negative electrode structure to ensure good electronic conductivity in the negative electrode. According to this embodiment the carbon black preferably has a low surface area. Most preferably it is a lampblack or an acetylene black.

The carbon black material used according to the invention is present as an additive in electrodes based predominantly on natural flake graphite. The resulted negative electrode has a low and staged voltage profile versus lithium, which is characteristic for lithium intercalation into graphite materials.

Thus, in a preferred embodiment of the invention the negative electrode composition comprises 40 to 81% by weight of natural flake graphite, 15 to 56% by weight of a lampblack, and 4 to 10% by weight of a binder, preferably a polymeric binder.

In another preferred embodiment of the invention the negative electrode composition comprises 80 to 93% by weight of natural flake graphite, 3 to 16% by weight of an acetylene black, and 4 to 15% by weight of a binder, preferably a polymeric binder.

In a preferred embodiment of the invention the electrolyte comprises a solvent mixture (in addition to PC) of one or more of the following solvents:

(a) alicyclic carbonates represented by the following general formula:

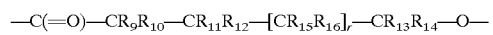

wherein each of $R_1$, $R_2$, $R_3$, $R_4$, $R_5$ and $R_6$ independently represents hydrogen or a $C_1$–$C_4$ alkyl group and m is 0 or 1, with the proviso that when m is 0 and all of $R_1$, $R_2$ and $R_5$ are hydrogen, $R_6$ is not methyl, preferably ethylene carbonate;

(b) aliphatic carbonates represented by the general formula: $R_7[OC(O)]_pOR_8$, wherein each of $R_7$ and $R_8$ independently represents a $C_1$–$C_4$ alkyl group, and p is an integer equal to 1 or 2, preferably dimethyl carbonate or diethyl carbonate;

(c) lactones in the form of cyclic esters represented by the general formula:

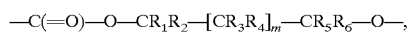

wherein each of $R_9$, $R_{10}$, $R_{11}$, $R_{12}$, $R_{13}$, $R_{14}$, $R_{15}$ and $R_{16}$ independently represents hydrogen or a $C_{1-2}$ alkyl group and r is 0 or 1, preferably γ-valerolactone or γ-butyrolactone;

(d) esters represented by the formula $R_{17}[C(O)]OR_{18}[OR_{19}]_t$, wherein each of $R_{17}$, $R_{18}$ and $R_{19}$ independently represents hydrogen or a $C_1$–$C_2$ alkyl group, and t is 0 or an integer equal to 1 or 2, preferably an acetate, more preferably (2 methoxyethyl)-acetate or ethyl acetate;

(e) glymes represented by the general formula $R_{20}O(R_{21}O)_nR_{22}$, in which each of $R_{20}$ and $R_{22}$ independently represents a $C_{1-2}$ alkyl group, $R_{21}$ is —(CR$_{23}$R$_{24}$CR$_{25}$R$_{26}$)— wherein each of $R_{23}$, $R_{24}$, $R_{25}$ and $R_{26}$ independently represents hydrogen or a $C_1$–$C_4$ alkyl group, and n is an integer from 2 to 6, preferably 3, $R_{20}$ and $R_{22}$ preferably being methyl groups, $R_{23}$, $R_{24}$, $R_{25}$ and $R_{26}$ preferably being hydrogen or $C_1$–$C_2$ alkyl groups, more preferably hydrogen.

Preferably the salt included in the electrolyte is an alkali metal salt or a quaternary ammonium salt of ClO$_4$—, CF$_3$SO$_3$—, AsF$_6$—, PF$_6$— or BF$_4$—, or any mixture of such alkali or ammonium salts, preferably LiAsF$_6$, LiCF$_3$SO$_3$, LiPF$_6$, LiBF$_4$, N(Et)$_4$BF$_4$ or N(Bu)$_4$BF$_4$ or any mixture thereof, more preferably LiPF$_6$ or LiBF$_4$.

The present invention is furthermore concerned with a simple and economically advantageous method for the production of a negative electrode composition for lithium secondary batteries, said electrode composition offering improved performance in combination with PC-based electrolytes in terms of high capacity, good cyclability and reduced irreversible capacity loss compared to electrodes of the state-of-the-art.

Thus, according to the invention a method is provided by which a carbon black and a natural flake graphite are ground in a solvent which contains a binder, to produce a uniform, viscous slurry, followed by coating of the slurry onto a substrate, preferably a metal foil substrate, evaporation of the solvent and drying at elevated temperature.

The binder is preferably a polymeric binder, more preferably EPDM (ethylene-propylene-diene-polymethylene).

The solvent used in the electrode manufacturing process is preferably selected among alicyclic compounds, such as cyclohexane.

The following non-limiting examples illustrate production of various embodiments of the electrode composition according to the invention.

EXAMPLE 1

2.6 g of a natural flake graphite (HPM850 from Asbury, USA) of a particle size lower than 5 μm, 2.0 g of lamp black and 8.0 g of a 5% solution of EPDM (ethylene-propylene-diene-polymethylene; amorphous, oil-free, of medium saturation, ethylene content of 50%) in cyclohexane was introduced into a Ø100 mm porcelain mortar. The resulting mixture was subjected to 30 min. of grinding in order to mix the components and to produce a uniform slurry for coating. During mixing a further 15.0 g of cyclohexane was added. A portion of the slurry was poured onto a nickel foil substrate and spread out on the substrate by wirebar coating, thereby forming a uniform thin layer. The coated layer was kept in air for 20 min., and then dried in an oven at 110° C. for 3 hours. The resulting negative electrode was tested in half cells against lithium metal, applying a 1M $LiPF_6$ in PC/EC (50%/50% by weight) electrolyte. In the test the electrodes were charged and discharged galvanostatically between 0.01 V and 1.5 V vs. $Li/Li^+$. Irreversible capacity losses were derived from the first charge-discharge cycle, whereas the reversible capacity was defined as the first discharge capacity.

The electrode obtained having a composition of 52% by weight of a graphite, 40% by weight of lamp black and 8% by weight of binder, provided a reversible capacity of 345 mAh/g. The initial irreversible capacity loss was 100 mAh/g, say about 22% of the initial capacity. The discharge-charge cyclability of the electrode produced exceeded 100 cycles at 80% of the initial reversible capacity.

The said reversible capacity of 345 mAh/g was obtained at a 1 hour discharge rate. At a 20 min. 3C discharge rate, the reversible capacity was 245 mAh/g.

COMPARATIVE EXAMPLE 2.6 g of graphitized carbon (artificial graphite, KS6 from TIMCAL (former Lonza) of Switzerland), 2.0 g of lamp black and 8.0 g of a 5% solution of EPDM (ethylene-propylene-diene-polymethylene; amorphous, oil free, of medium saturation, ethylene content of 50%) in cyclohexane was introduced into a Ø100 mm porcelain mortar. The resulting mixture was subjected to 30 min. of grinding in order to mix the components and to produce a uniform slurry for coating. During mixing a further 15.0 g of cyclohexane was added. A portion of the slurry was poured onto a nickel foil substrate and spread out on the substrate by wirebar coating, thereby forming a uniform thin layer. The coated layer was kept in air for 20 min., and then dried in an oven at 110 C for 3 hours. The resulting negative electrode was tested in half cells against lithium metal, applying a 1M $LiPF_6$ in PC/EC (50%/50% by weight) electrolyte. In the test the electrodes were charged and discharged galvanostatically between 0.01 V and 1.5 V vs. $Li/Li^+$. Irreversible capacity losses were derived from the first charge-discharge cycle, whereas the reversible capacity was defined as the first discharge capacity.

The electrode obtained having a composition of 52% by weight of graphite, 40% by weight of lamp black and 8% by weight of binder, provided a reversible capacity of 322 mAh/g. The initial irreversible capacity loss was 1080 mAh/g, say about 77% of the initial capacity.

EXAMPLE 2

A series of natural graphite materials with different mean particle size (3–25 μm) were made into electrodes following the above procedure. They were tested in electrochemical cells using lithium metal as counter electrode and 1M $LiPF_6$ in ethylene carbonate/dimethyl carbonate (EC/DMC) and 1M $LiPF_6$ in ethylene carbonate/propylene carbonate (EC/PC) as electrolyte, respectively. With EC/DMC it was found, that the initial capacity loss decreased as the mean particle size was increased. With the EC/PC-electrolyte, the initial loss increased dramatically with the mean particle size. When the mean particle size was lower than 10 μm, however, the loss with EC/PC was just as low as with EC/DMC.

EXAMPLE 3

Electrochemical cells were prepared from laminates of negative electrode composition of the above Example 1, laminates of a lithium manganese oxide spinel positive electrode (prepared from lithium carbonate and manganese dioxide by a solid state reaction at 800° C.) coated on an aluminium foil, and a 1M $LiPF_6$ in PC/EC (50%/50% by weight) electrolyte sandwiched between said laminates. The negative electrode structures of such cells displayed gravimetric and charge densities as high as 0.8 g/cc and 240 mAh/$cm^3$ respectively and provided a battery energy density of 180 Wh/l.

What is claimed is:

1. A lithium secondary battery comprising a negative electrode structure, an electrolyte and a positive cathode structure, said negative electrode structure comprising at least 40% by weight of natural flake graphite having an $L_a$-value of at least 300 nm and/or an $L_c$-value in the range 50–150 nm, and an $L_a/L_c$-ratio of at least 2, and said electrolyte comprising at least 10% by weight of propylene carbonate based on the weight of the solvent and salts of the electrolyte system.

2. A secondary battery according to claim 1, in which the natural flake graphite has a particle size of 10 μm or less, preferably 5 μm or less.

3. A secondary battery according to claim 1, in which the negative electrode structure comprises at least 3% by weight of a carbon black.

4. A secondary battery according to claim 3, in which said carbon black is an acetylene black.

5. A secondary battery according to claim 4, in which the negative electrode structure comprises 80 to 93% by weight of natural flake graphite, 3 to 16% by weight of an acetylene black, and 4 to 15% by weight of a polymeric binder.

6. A secondary battery according to claim 1, in which the electrolyte comprises at least 40 percent by weight of propylene carbonate.

7. A secondary batter according to claim 1, wherein the solvent in addition to propylene carbonate, comprises one or more of the following solvents (a) to (e):

(a) alicyclic carbonates represented by the following general formula:

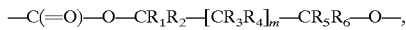
—C(=O)—O—$CR_1R_2$—[$CR_3R_4$]$_m$—$CR_5R_6$—O—, wherein each of $R_1$, $R_2$, $R_3$, $R_4$, $R_5$ and $R_6$ independently represents hydrogen or a $C_1$–$C_4$ alkyl group and m is 0 or 1, with the proviso that when m is 0 and all of $R_1$, $R_2$ and $R_5$ are hydrogen, and $R_6$ is other than methyl carbonate;

(b) aliphatic carbonates represented by the general formula $R_7[OC(O)]_pOR_8$, wherein each of $R_7$ and $R_8$ independently represents a $C_1$–$C_4$ alkyl group, and p is an integer equal to 1 or 2, and is one of dimethyl carbonate or diethel carbonate;

(c) lactones in the form of cyclic esters represented by the general formula:

—C(=O)—$CR_9R_{10}$—$CR_{11}R_{12}$—[$CR_{15}R_{16}$]$_r$—$CR_{13}R_{14}$—O— wherein each of $R_9$, $R_{10}$, $R_{11}$, $R_{12}$, $R_{13}$, $R_{14}$, $R_{15}$ and $R_{16}$ independently represents hydrogen or a $C_{1-2}$ alkyl group and r is 0 or 1 and is one of γ-valerolactone or γ-butyrolactone;

(d) esters represented by the formula $R_{17}[C(O)]OR_{18}[OR_{19}]_t$, wherein each of $R_{17}$, $R_{18}$ and $R_{19}$ independently represents hydrogen or a $C_1$–$C_2$ alkyl group, and t is 0 or an integer equal to 1 or 2, and an acetate;

(e) glymes represented by the general formula $R_{20}O(R_{21}O)_nR_{22}$, in which each of $R_{20}$ and $R_{21}$ independently represents a $C_{1-2}$ alkyl group, $R_{21}$ is —$(CR_{23}R_{24}CR_{25}R_{26})$— wherein $R_{23}$, $R_{24}$, $R_{25}$ and $R_{26}$ each independently represents hydrogen or a $C_1$–$C_4$ alkyl group, and n is an integer from 2 to 6, $R_{20}$ and $R_{22}$ are methyl groups, $R_{23}$, $R_{24}$, $R_{25}$ and $R_{26}$ are one of hydrogen or $C_1$–$C_2$ alkyl groups.

8. A secondary battery according to claim 1, in which the salt of the electrolyte is one of an alkali metal salt or a quaternary ammonium salt selected from the group consisting of $ClO_4$—, $CF_3SO_3$—, $AsF_6$—, $PF_6$—, or $BF_4$—, or any mixture of such alkali or ammonium salts, selected from the group consisting of $LiAsF_6$, $LiCF_3SO_3$, $LiPF_6$, $LiBF_4$, $N(Et)_4BF_4$ or $N(Bu)_4BF_4$ or any mixture thereof.

9. A secondary battery according to claim 1, in which the positive electrode structure is a Li-intercalation material selected from the group consisting of $LiCoO_2$, $LiNiO_2$, $LiMn_2O_4$ Or $LiMnO_2$ or a mixture thereof.

10. A method for the production of a secondary battery according to claim 1 comprising the steps of:

preparing the negative electrode composition by:
grinding the graphite and any carbon black in a solvent containing a binder until a uniform, viscous slurry is obtained;
coating the slurry onto a substrate;
evaporating the solvent and drying;

preparing the electrolyte by:
mixing the solvents in the case where the electrolyte comprises more than one solvent, the final solvent comprising at least 10% by weight of propylene carbonate;
dissolving alkali metal or ammonium salt(s) in the solvent(s) to provide a propylene carbonate-based electrolyte;

preparing the positive electrode composition by:
grinding positive electrode material in a solvent containing a binder until a uniform, viscous slurry is obtained;
coating the slurry onto a substrate,
evaporating the solvent and drying; and
sandwiching said electrolyte between the electrode laminates to form the battery.

11. A lithium secondary battery comprising a negative electrode structure, an electrolyte and a positive cathode structure, said negative electrode structure comprising at least 40% by weight of natural flake graphite having an $L_a/L_c$-ratio of at least 2, and said electrolyte comDrising at least 10% by weight of propylene carbonate based on the weight of the solvent and salts of the electrolyte system, wherein the negative electrode structure comprises at least 3% by weight of a carbon black, and wherein said carbon black is a lampblack.

12. A secondary battery according to claim 5, in which the negative electrode structure comprises 40 to 81% by weight of natural flake graphite, 15 to 56% by weight of a lampblack, and 4 to 10% by weight of a binder, preferably a polymeric binder.

* * * * *